(12) United States Patent
Metzler et al.

(10) Patent No.: US 7,864,768 B2
(45) Date of Patent: *Jan. 4, 2011

(54) DEVICE, SYSTEM AND METHOD OF MULTICAST/BROADCAST COMMUNICATION

(75) Inventors: Benjamin T. Metzler, Beaverton, OR (US); Emily H. Qi, Portland, OR (US); Jesse Walker, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 644 days.

This patent is subject to a terminal disclaimer.

(21) Appl. No.: 11/580,441

(22) Filed: Oct. 13, 2006

(65) Prior Publication Data

US 2008/0089331 A1    Apr. 17, 2008

(51) Int. Cl.
*H04H 1/00* (2006.01)
*H04L 12/56* (2006.01)
*H04J 3/24* (2006.01)

(52) U.S. Cl. .................. 370/390; 370/312; 370/394; 370/432; 370/338; 370/333; 370/352

(58) Field of Classification Search .................. 370/312, 370/390, 394, 432, 338, 333, 352
See application file for complete search history.

(56) References Cited

U.S. PATENT DOCUMENTS

| 6,327,247 | B1 * | 12/2001 | Naudts .................. 370/232 |
| 7,095,739 | B2 * | 8/2006 | Mamillapalli et al. ....... 370/390 |
| 2005/0169179 | A1 * | 8/2005 | Antal et al. .............. 370/231 |
| 2005/0213576 | A1 * | 9/2005 | Stephens .................. 370/390 |
| 2006/0029023 | A1 * | 2/2006 | Cervello et al. ............ 370/333 |
| 2006/0146822 | A1 * | 7/2006 | Kolakowski et al. ........ 370/390 |
| 2006/0262795 | A1 * | 11/2006 | Mamillapalli et al. ....... 370/390 |
| 2007/0153789 | A1 * | 7/2007 | Barker et al. ............. 370/390 |
| 2007/0192451 | A1 * | 8/2007 | Tran et al. ................ 709/223 |

* cited by examiner

*Primary Examiner*—Vincent P Harper
*Assistant Examiner*—Khalid Shaheed
(74) *Attorney, Agent, or Firm*—Kacvinsky Daisak PLLC

(57) ABSTRACT

An embodiment of the present invention provides an apparatus, comprising a transmitter to transmit, in response to an incoming multicast communication frame received from a multicast communication source, a multicast acknowledgment frame indicating receipt of the incoming multicast communication frame, wherein the apparatus is randomly designated by the multicast communication source as a representative multicast communication recipient. In an embodiment of the present invention the representative multicast communication recipient may be chosen from a subset of connected stations.

10 Claims, 5 Drawing Sheets

DEVICE, SYSTEM AND METHOD OF MULTICAST/BROADCAST COMMUNICATION

BACKGROUND

In the field of wireless communication, a wireless Access Point (AP) may transmit data over a shared access medium to multiple wireless communication stations, for example, using multicast or broadcast mechanisms. For example, audio streaming, video streaming, gaming applications, enterprise training applications, and other types of applications may utilize multicast or broadcast to transmit data to multiple stations.

Unfortunately, due to characteristics of the shared access medium, and due to mobility of the wireless communication stations, the data transfer using multicast or broadcast may not be reliable; for example, one or more of the wireless communication stations may experience a relatively high frame loss rate (FLR). A leader methodology has been proposed as one solution to this reliability problem.

Inherent in any wireless network is the ability for a malicious agent to sniff, intercept, and counterfeit wireless traffic. This is due to the over-the-air aspect of wireless traffic. As a result, a leader methodology can be compromised through the use of counterfeit acknowledgements. In a compromised scenario, a rogue station could monitor the network for the designated leader and use this information to ACK all traffic, reducing the effectiveness of the leader-based ACK system. Further, by determining the leader of the network, a malicious agent can target that station for attack, potentially affecting the entire network by requiring that the AP rebroadcast packets that were lost by the leader during the attack.

Thus, a strong need exists for a more secure device, system and method of multicast/broadcast communications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
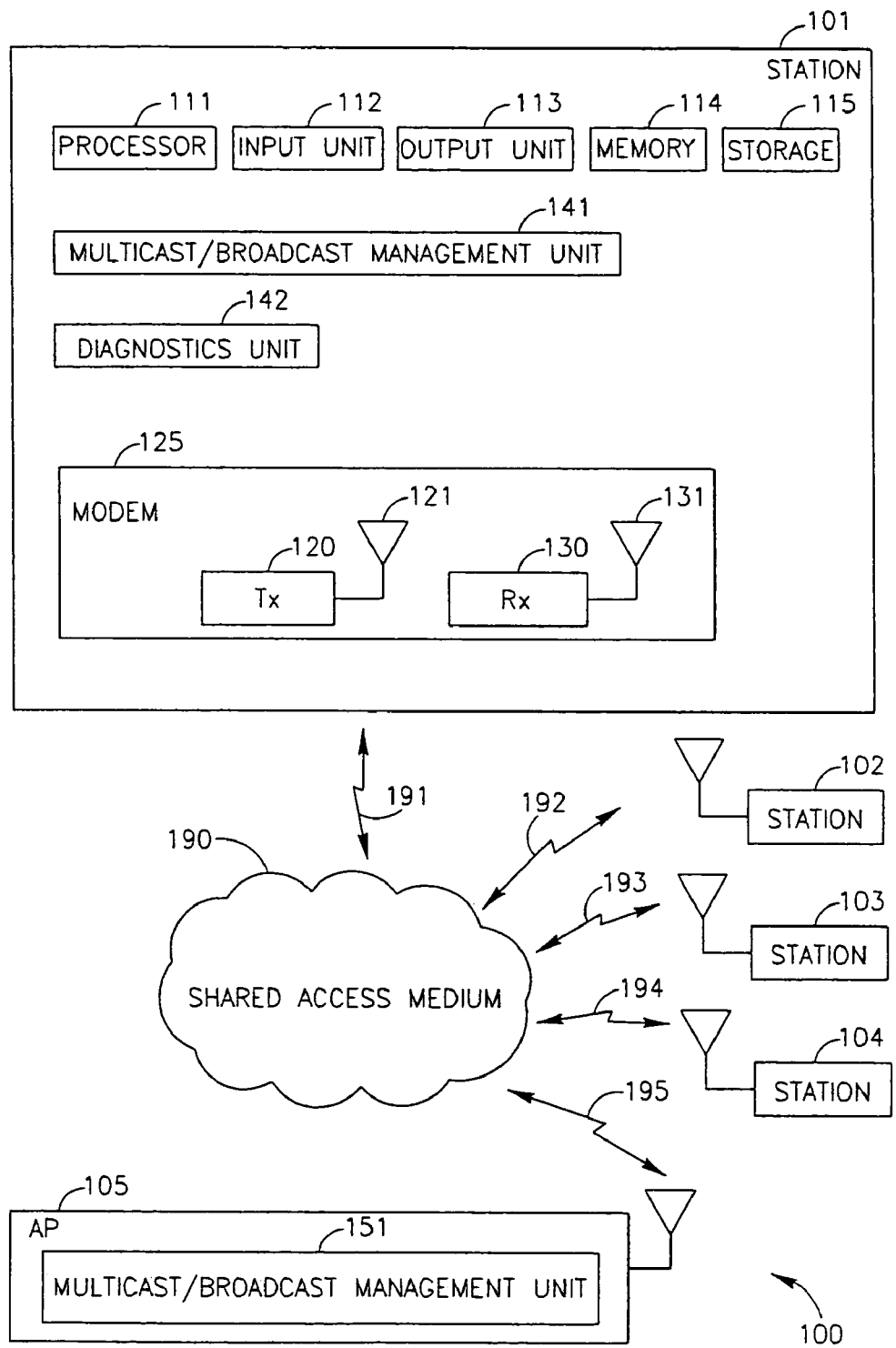
FIG. 1 is a schematic block diagram of a wireless communication system able to utilize multicast/broadcast communication in accordance with an embodiment of the invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth™, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "multicast/broadcast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using TCP/IP, broadcast communication using TCP/IP, webcast communication (e.g., using the World Wide Web), and/or other types of communication, e.g., non-unicast communication.

FIG. 1 schematically illustrates a block diagram of a wireless communication system 100 able to utilize multicast/broadcast communication in accordance with a demonstrative embodiment of the invention. System 100 may include one or more wireless communication stations, for example, stations 101, 102, 103 and 104. System 100 may optionally include a wireless Access Point (AP) 105. In some embodiments, stations 101-104 and AP 105 may communicate using a shared access medium 190, for example, through wireless communication links 191-195, respectively. In some embodiments, stations 101-104 and AP 105 may be able to communicate in accordance with a wireless communication standard or protocol, for example, IEEE 802.11 standard, IEEE 802.16 standard, or the like.

Station 101 may include, for example, a processor 111, an input unit 112, an output unit 113, a memory unit 114, a storage unit 115, and a modem having a transmitter 120 and a receiver 130. Station 101 may optionally include other suitable hardware components and/or software components. In some embodiments, the components of station 101 may be enclosed in, for example, a common housing, packaging, or the like.

Processor 111 may include, for example, a Central Processing Unit (CPU), a Digital Signal Processor (DSP), a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may, for example, process signals and/or data transmitted and/or received by station 101.

Input unit 112 may include, for example, a keyboard, a keypad, a mouse, a touch-pad, a stylus, a microphone, or other suitable pointing device or input device. Output unit 113 may include, for example, a Cathode Ray Tube (CRT) monitor or display unit, a Liquid Crystal Display (LCD) monitor or display unit, a screen, a monitor, a speaker, or other suitable display unit or output device.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units. Memory unit 114 and/or storage unit 115 may, for example, store data transmitted and/or received by station 101.

Transmitter 120 may include, for example, a wireless Radio Frequency (RF) transmitter able to transmit wireless RF signals, e.g., through an antenna 121. Receiver 130 may include, for example, a wireless RF receiver able to receive wireless RF signals, e.g., through an antenna 131. In some embodiments, for example, transmitter 120 and/or receiver 130 may be implemented using a transceiver or a transmitter-receiver, using modem 125, using a Network Interface Card (NIC), or one or more units able to perform separate or integrated functions of transmitting and/or receiving wireless communication signals, blocks, frames, transmission streams, packets, messages and/or data.

Antenna 121 and/or antenna 131 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data. In some embodiments, optionally, antenna 121 and antenna 131 may be implemented using a common or single antenna, e.g., a transmit/receive antenna, or using a common set of transmit/receive antennas.

In some embodiments, for example, AP 105 may transmit data intended to be received by one or more of station 101-104 using multicast or broadcast. For example, AP 105 may use multicast to transmit data to a group of stations (e.g., the group including or more of station 101-104) of system 100, may use broadcast to transmit data to substantially all possible listening devices of system 100, may utilize a limited broadcast mechanism based on a network segment, may utilize a direct broadcast mechanism to transmit data to host devices of system 100, or the like. In some embodiments, the multicast/broadcast may be over a wireless mesh network, an ad-hoc network, a Basic Service Set (BSS), an Independent BSS (IBSS), an infrastructure network, or the like.

In accordance with some embodiments of the invention, one or more of stations 101-104 may generate diagnostics information regarding one or more properties of the multicast/broadcast communication, and may transmit the diagnostic information to AP 105, for example, periodically, at pre-defined time intervals, upon demand, autonomously, when a pre-defined condition is met, in response to a triggering event, or the like. For example, station 101 may include a diagnostics unit 142 able to monitor and/or analyze the multicast/broadcast transmission(s) received from AP 105, and able to generate multicast/broadcast diagnostics information. The diagnostics information may include, for example, received multicast/broadcast frame count, received channel power indicator (RCPI) associated with one or more received multicast/broadcast frames (e.g., with the latest received or most recently received multicast/broadcast frame), received signal-to-noise indicator (RSNI) associated with one or more received multicast/broadcast frames (e.g., with the latest received or most recently received multicast/broadcast frame), or quality indicators associated with one or more received multicast/broadcast frames or with the incoming multicast/broadcast transmission.

The diagnostics information may be received by AP 105, for example, from station 101 and/or from one or more of the other stations 102-104. Based on the received diagnostics information, AP 105 may estimate the reliability and/or other quality indicators associated with the multicast/broadcast. For example, based on diagnostics information which may include received multicast/broadcast frame count, AP 105 may calculate a multicast/broadcast frame loss rate (FLR) or frame drop rate, associated with one or more of stations 101-104. In some embodiments, optionally, AP 105 may adaptively or selectively modify one or more properties of the multicast/broadcast communication, for example, taking into account or based on diagnostics information received from one or more stations 101-104. In some embodiments, based on the received multicast/broadcast diagnostics information, the AP 105 may calculate or estimate the number of multicast/broadcast recipients in the network.

In some embodiments, one of stations 101-104 may be designated (e.g., by AP 105) to operate as a "leader" station (e.g., an acknowledger station, an acknowledgement sender station, a confirming station, a designated station, an assigned station, a selected station, a selectively designated station, an appointed station, an elected station, a representative station, a representative recipient station, or the like). In a demonstrative embodiment, for example, station 101 may be designated as leader station, whereas stations 102-104 may not be designated as leader stations. The leader station 101 may, for example, exchange protocol messages with AP 105. For example, when the leader station 101 receives a multicast/broadcast frame from AP 105, the leader station 101 may transmit an acknowledgment (ACK) packet or message to AP 105.

In some embodiments, AP 105 may modify the multicast/broadcast communication, for example, by taking into account whether or not an ACK packet or message is received from the leader station 101. For example, in some embodiments, AP 105 may re-transmit a multicast/broadcast frame, e.g., repeatedly, substantially continuously, for a pre-defined number of times, or the like, until an ACK packet or message is received from the leader station 101. Optionally, the AP 105 may cease to re-transmit the multicast/broadcast if a pre-defined number of re-transmissions is reached, for example, based on a value of a Multicast_Retry_Limit parameter.

In some embodiments, AP 105 may select one or more of stations 101-104 as "leader" station by taking into account diagnostics information received from one or more station 101-104. In one embodiment, AP 105 may instruct the station 101 to operate as "leader" station, and upon such instruction, station 101 may operate as "leader" station. In another embodiment, AP 105 may request that station 101 operate as "leader" station, e.g., by transmitting a request message; and in response, station 101 may transmit a positive response, indicating that station 101 accepts to operate as "leader" station, or a negative response, indicating that station 101 does not accept to operate as "leader" station and that AP 105 is required to designate another station as "leader" station. In some embodiments, optionally, communication between AP 105 and/or station 101 (e.g., ACK packet or message, request to designate as leader, response to the request to designate as leader, or the like) may utilize a request-to-send (RTS) mechanism, a clear-to-send (CTS) mechanism, a RTS/CTS mechanism, or other suitable protocol mechanisms.

In some embodiments, leader station 101 may transmit a notification to AP 105 to indicate that leader station 101 is about to disconnect (e.g., move out, log off, or otherwise leave or exit) from a wireless network common to AP 105 and leader station 101, or that AP 105 disconnected from such wireless network. In response, the AP 105 may designate another station as "leader", for example, based on diagnostics information received from one of the stations 101-104 that remain in the wireless network.

In some embodiments, AP 105 and one or more of stations 101-104 (for example, including leader station 101 and/or other stations) may exchange messages, e.g., protocol messages. For example, AP 105 and one or more of stations 101-104 may exchange messages to indicate or otherwise negotiate parameters which may allow improved or more reliable multicast/broadcast communication, e.g., parameters of capability or policy related to the multicast/broadcast communication. In some embodiments, for example, the protocol messages may be exchanged during an association process or a re-association process. In some embodiments, AP 105 may transmit to one or more of station 101-104 (e.g., using multicast/broadcast communication) a request for multicast/broadcast diagnostics information; and in response, one or more of station 101-104 may transmit to AP 105 (e.g., using unicast) a response which may include multicast/broadcast diagnostics information. In some embodiments, AP 105 and/or stations 101-104 may utilize a pre-defined protocol to exchange multicast/broadcast diagnostics requests, responses and/or information.

In some embodiments, for example, station 101 (or one or more of stations 102-104) may include a multicast/broadcast management unit 141, which may be used to manage the diagnostics unit 142, to control or handle the exchange of protocol messages with AP 105, or to perform other operations related to the multicast/broadcast communication in accordance with some embodiments of the invention. The multicast/broadcast management unit 141 and/or the diagnostics unit 142 may optionally be implemented, for example, using separate components or units, using an integrated or combined unit, using hardware component(s), using software component(s), as part of processor 111, as part of modem 125, or the like.

In some embodiments, for example, AP 105 may include a multicast/broadcast management unit 151, which may be used to analyze the incoming multicast/broadcast diagnostics information, to select or re-select leader station(s), to monitor the incoming multicast/broadcast diagnostics information, to monitor the received (or expected to be received) multicast/broadcast acknowledgment frames, to activate or de-activate (or otherwise modify) a multicast/broadcast acknowledgment scheme, or the like. The multicast/broadcast management unit 151 may optionally be implemented, for example, using separate components or units, using an integrated or combined unit, using hardware component(s), using software component(s), as part of a processor or a modem of AP 105, or the like.

In some embodiments, a "leader" station may be identified (e.g., in protocol messages) using a pre-defined indication. In one embodiment, for example, a field of the MAC header (e.g., the "Address 4" field) may be used to identify that a message is sent to or from a "leader" station. In another embodiment, for example, a pre-defined mechanism may be used to assign a "leader" station. For example, AP 105 may selectively transmit to a certain station (e.g., to station 101) a request for assignment as a leader station ("Leader Assignment Request"). The station 101 may respond, for example, with a response indicating whether or not the station 101 accepts to operate as a leader station ("Leader Assignment Response").

Figure 2:
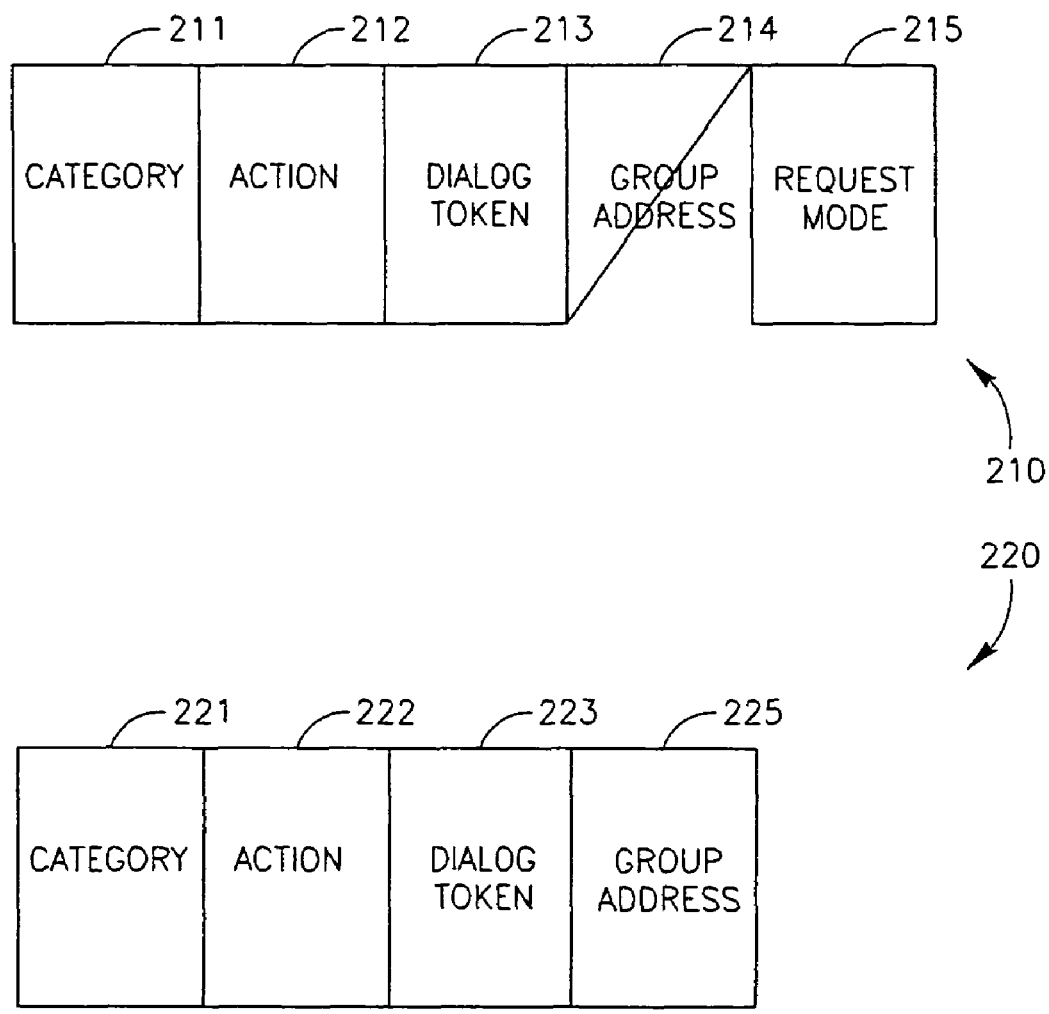
FIG. 2 is a schematic diagram of frame formats which may be utilized to represent a Leader Assignment Request and a Leader Assignment Response, respectively, in accordance with an embodiment of the invention.

FIG. 2 schematically illustrates frame formats which may be utilized to represent a Leader Assignment Request and a Leader Assignment Response, respectively, in accordance with some embodiments of the invention. A demonstrative management frame 210 may be used, for example, to represent a Leader Assignment Request; whereas a demonstrative management frame 220 may be used, for example, to represent a Leader Assignment Response. Other types of multicast/broadcast management frames may be used, for example, to allow an AP and one or more stations to negotiate or execute a multicast/broadcast leader-based acknowledgment mechanism.

Frame 210 may include, for example, a category field 211, having a value representing a type of frame or other network management information; an action field 212, having a value representing that frame 210 is a Leader Assignment Request; a dialog token field 213, having a value which may be used for matching between a certain Leader Assignment Request and a corresponding Leader Assignment Response, or vice versa; a multicast/broadcast group address field 214, having a value (e.g., a six-octet value) representing a multicast/broadcast group address; and a multicast/broadcast request mode field 215, having a value representing whether or not periodic multicast/broadcast diagnostics information are requested.

Frame 220 may include, for example, a category field 221, having a value representing a type of frame or other network management information; an action field 222, having a value representing that frame 220 is a Leader Assignment Response; a dialog token field 223, having a value which may be used for matching between a certain Leader Assignment Request and a corresponding Leader Assignment Response, or vice versa; and a multicast/broadcast response mode field 225, having one or more values representing whether the station accepts or rejects the request to operate as a "leader" station, and/or whether the station accepts or rejects the request to periodically transmit multicast/broadcast diagnostics information.

Figure 3:
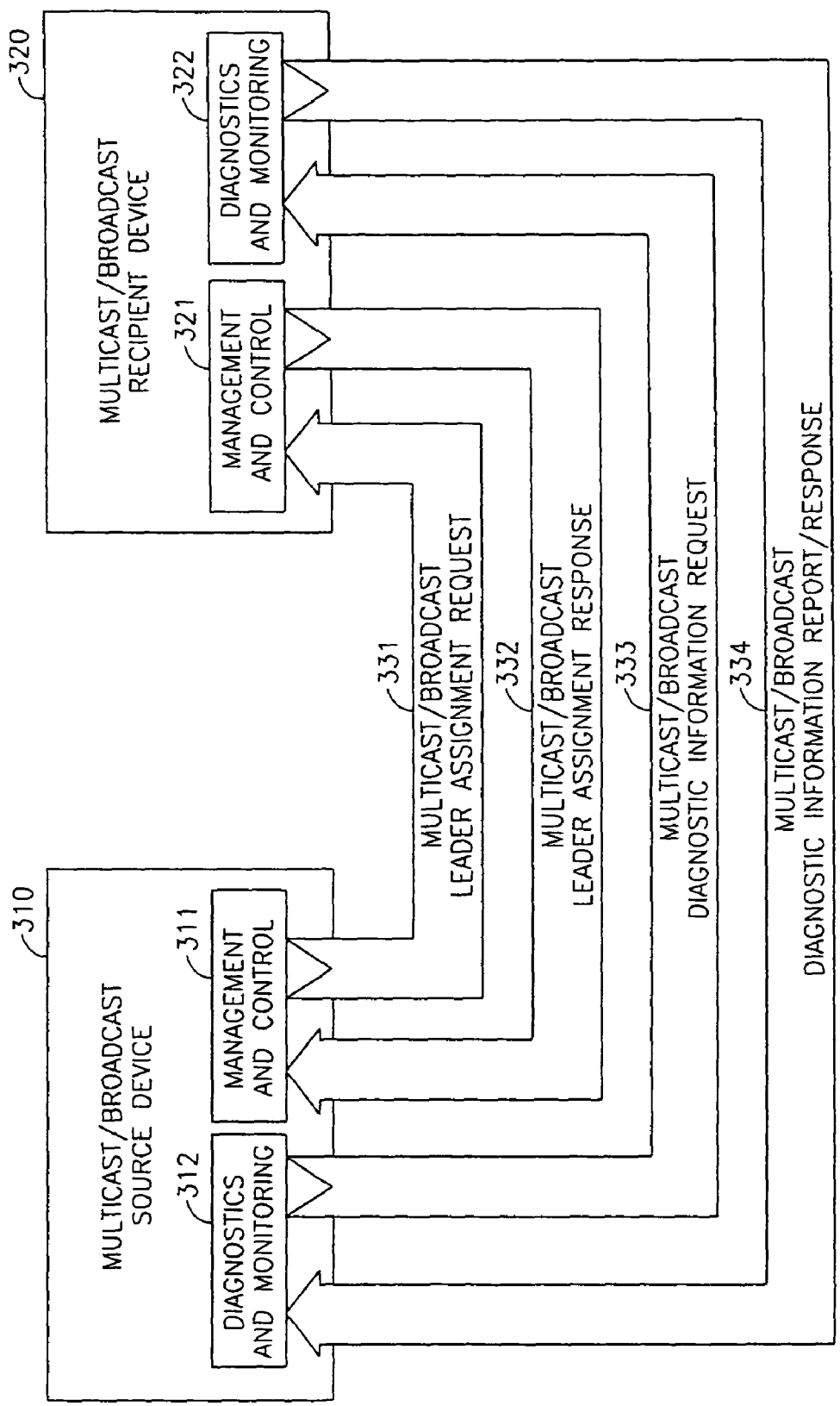
FIG. 3 is a schematic block diagram demonstrating exchange of requests, responses and information in accordance with an embodiment of the invention.

FIG. 3 schematically illustrates exchange of requests, responses and information in accordance with some embodiments of the invention. The exchange may be performed, for example, between a multicast/broadcast source device 310 (e.g., corresponding to AP 105 of FIG. 1) and a multicast/broadcast recipient device 320 (e.g., corresponding to station 101 of FIG. 1).

Multicast/broadcast source device 310 may include, for example, a management and control unit 311 able to perform operations related to management of the multicast/broadcast communication, for example, selection and assignment of "leader" station(s); and a diagnostics and monitoring unit 312 able to perform analysis operations related to diagnostics information received from one or more stations (e.g., from multicast/broadcast recipient device 320).

Multicast/broadcast recipient device 320 may include, for example, a management and control unit 321 able to perform operations related to management of the multicast/broadcast communication, for example, exchange of protocol messages with regard to "leader" assignment; and a diagnostics and monitoring unit 322 able to perform analysis operations and to generate diagnostics information to be transmitted to the multicast/broadcast source device 310.

As indicated by arrow 331, the management and control unit 311 of the multicast/broadcast source device 310 may transmit a multicast/broadcast leader assignment request to the management and control unit 321 of the multicast/broadcast recipient device 320. In response, as indicated by arrow 332, the management and control unit 321 of the multicast/broadcast recipient device 320 may transmit a multicast/broadcast leader assignment response to the management and control unit 311 of the multicast/broadcast source device 310

As indicated by arrow 333, the diagnostics and monitoring unit 312 of the multicast/broadcast source device 310 may transmit a multicast/broadcast diagnostics information request to the diagnostics and monitoring unit 322 of the multicast/broadcast recipient device 320. In response, as indicated by arrow 334, the diagnostics and monitoring unit 322 of the multicast/broadcast recipient device 320 may transmit a multicast/broadcast diagnostics information report (or other suitable response) to the diagnostics and monitoring unit 312 of the multicast/broadcast source device 310.

Figure 4:
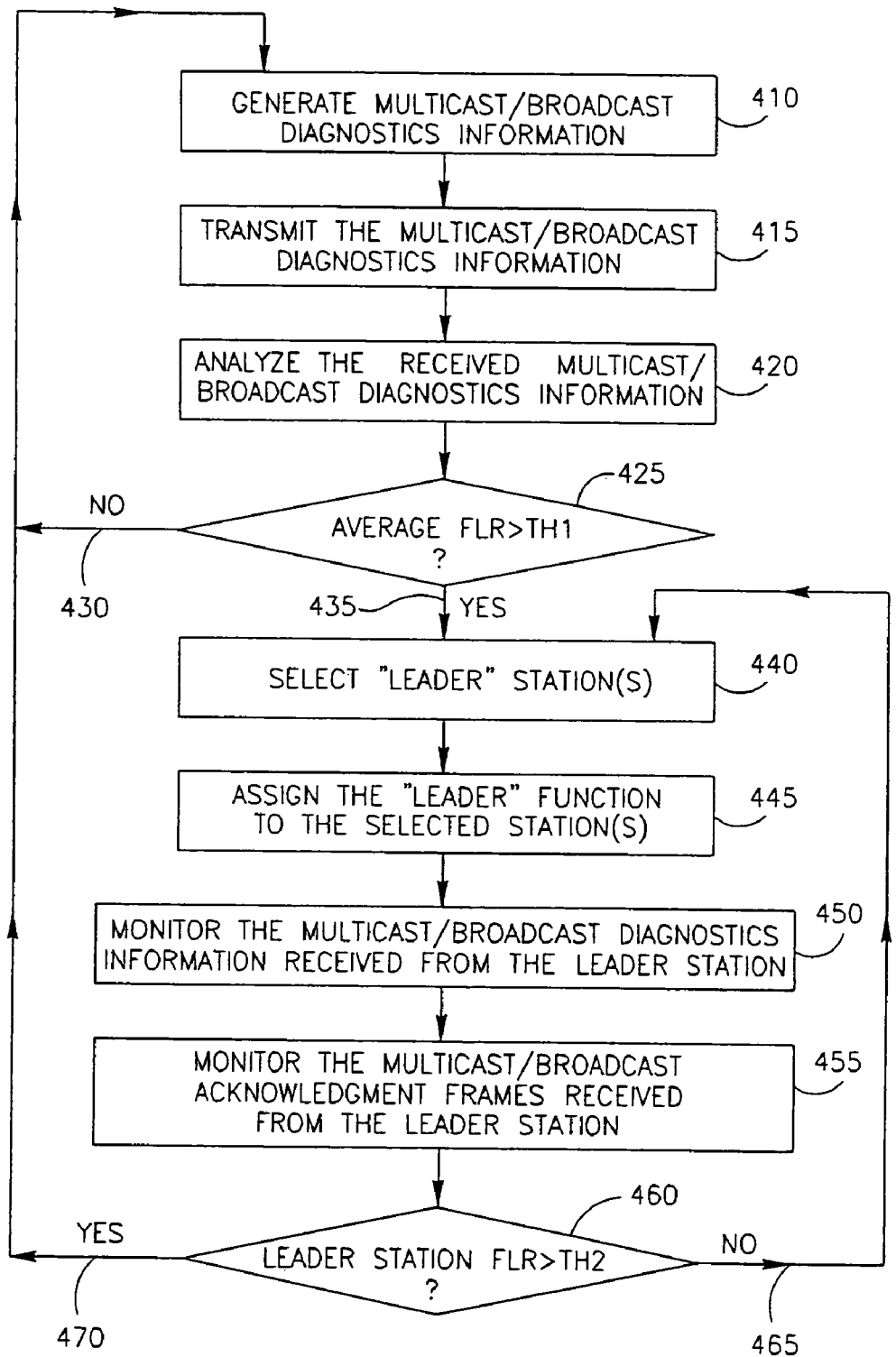
FIG. 4 is a schematic flow-chart of a method of multicast/broadcast communication in accordance with an embodiment of the invention.

FIG. 4 is a schematic flow-chart of a method of multicast/broadcast communication in accordance with some embodiments of the invention. Operations of the method may be implemented, for example, by system 100 of FIG. 1, by station 101 of FIG. 1, by AP 105 of FIG. 1, and/or by other suitable units, devices, and/or systems.

As indicated at box 410, the method may optionally include, for example, generating multicast/broadcast diagnostics information. This may be performed by one or more stations (e.g., one or more of stations 101-104 of FIG. 1) or other multicast/broadcast recipients. The diagnostics information may include, for example, received multicast/broadcast frame count, a RCPI, a RSNI, or other information.

As indicated at box 415, the method may optionally include, for example, transmitting the multicast/broadcast diagnostics information, e.g., by one or more stations 101-104 of FIG. 1 to AP 105 of FIG. 1.

As indicated at box 420, the method may optionally include, for example, analyzing of the received multicast/broadcast diagnostics information, e.g., by AP 105 of FIG. 1. For example, AP 105 may calculate or estimate a multicast/broadcast FLR associated with a station, an average FLR per station, or the like.

As indicated at box 425, the method for choosing nodes to be included in an acceptable nodes list may optionally include, for example, checking whether the average FLR is greater than a pre-defined threshold value, denoted TH1. In one embodiment, for example, it may be determined whether an average FLR associated with a certain station (e.g., station 101 of FIG. 1, or a station which may be a candidate for designation as "leader" station) is greater than the pre-defined threshold value TH1. In another embodiment, for example, it may be determined whether an average FLR associated with a multiple stations is greater than the pre-defined threshold value TH1. Other suitable conditions may be used.

As indicated by arrow 430, if the checking result is negative, e.g., if the average FLR is determined to be not greater than the pre-defined threshold value TH1, then the method may optionally include, for example, repeating one or more of the above operations, e.g., the operations of boxes 410 to 425. In one embodiment, for example, the method may avoid to initiate, or may de-activate, a multicast/broadcast communication scheme that utilizes a "leader" station functionality or a multicast/broadcast acknowledgment mechanism.

In contrast, as indicated by arrow 435, if the checking result is determined to be positive, e.g., if the average FLR is greater than the pre-defined threshold value TH1, then the method may optionally proceed to perform the operations of box 440 and onward. In one embodiment, for example, the method may initiate, re-initiate, switch to, activate or re-activate a multicast/broadcast communication scheme that utilizes a "leader" station functionality or a multicast/broadcast acknowledgment mechanism.

As indicated at box 440, the method may optionally include, for example, selecting (or re-selecting) one or more stations (e.g., out of multiple stations 101-104 of FIG. 1) for designation as "leader" station(s), e.g., station(s) that transmit multicast/broadcast acknowledgment frames or messages (e.g., to AP 105 of FIG. 1). For example, the selection may be performed based on, or taking into account, multicast/broadcast diagnostics information received from one or more of the stations.

As indicated at box 445, the method may optionally include, for example, assigning the "leader" function to the selected station(s) (e.g., to station 101 of FIG. 1). This may be performed, for example, using a multicast/broadcast leader assignment request and a corresponding multicast/broadcast leader assignment response.

As indicated at box 450, the method may optionally include, for example, monitoring the multicast/broadcast diagnostics information received from the leader station. For example, AP 105 may periodically or substantially continuously monitor the multicast/broadcast FLR associated with the leader station 101. This may include, for example, modifying the operations involved in the multicast/broadcast communication, or modifying a property of the multicast/broadcast, in response to (or based on) multicast/broadcast diagnostics information received from the leader station.

As indicated at box 455, the method may optionally include, for example, monitoring the multicast/broadcast acknowledgment frames (or messages) received from the leader station. For example, AP 105 may periodically or substantially continuously monitor the multicast/broadcast acknowledgment frames (or messages) received from the leader station 101. This may include, for example, modifying the operations involved in the multicast/broadcast communication, or modifying a property of the multicast/broadcast, in response to (or based on) whether or not a multicast/broadcast acknowledgment frame (or message) is received from the leader station 101. For example, if a multicast/broadcast acknowledgment frame is not received from the leader station 101 in response to a multicast/broadcast of a certain frame, then the AP 105 may repeatedly re-transmit that frame using multicast/broadcast communication, for example, for a pre-defined number of retries (e.g., four retries, seven retries, or the like).

As indicated at box 460, the method may optionally include, for example, checking whether the FLR associated with the leader station (or, in some embodiments, whether an average FLR associated with some or all the stations) is greater than a pre-defined threshold value, denoted TH2.

As indicated by arrow 465, if the checking result is determined to be negative, then the method may optionally include repeating the operations of box 440 and onward, such that another station may be selected to operate as a "leader". In some embodiments, optionally, the method may determine to switch from multicast/broadcast communication to unicast communication, e.g., if substantially no station is suitable to operate as a "leader" station (e.g., based on the station FLR or other properties), if substantially no station accepts a request to operate as a "leader" station, if substantially all stations decline a request to operate as a "leader" station, or in accordance with other suitable conditions or criteria. In some embodiments, optionally, a station may be designated or re-designated as a "leader" station based on a multicast frame loss rate associated with the station, for example, if the multicast frame loss rate is larger than a pre-defined threshold, and/or if the station is unassociated with the multicast communication source (e.g., AP 105 of FIG. 1). Other suitable criteria or conditions may be used for designating or re-designating "leader" station(s), or for switching from multicast/broadcast communication to unicast communication, or vice versa.

In contrast, as indicated by arrow 470, if the checking result is determined to be positive, then the method may optionally include, for example, repeating the operations of box 410 and onward.

Other operations or sets of operations may be used in accordance with embodiments of the invention.

In some embodiments, a "leader"-based multicast/broadcast acknowledgment scheme may, for example, increase the reliability of multicast/broadcast communication, increase overall network performance, increase overall network throughput. Some embodiments may, for example, provide a link level reliability indicator to a multicast/broadcast communication source. Embodiments of the invention may allow additional and/or other benefits or advantages.

With the higher reliability of the present invention also comes the possibility of counterfeit ACKs of broadcast traffic and a single failure point as the leader can be identified and targeted by malicious agents.

As mentioned above, inherent in any wireless network is the ability for a malicious agent to sniff, intercept, and counterfeit wireless traffic. This is due to the over-the-air aspect of wireless traffic. As a result, a leader methodology can be compromised through the use of counterfeit acknowledgements. In a compromised scenario, a rogue station could monitor the network for the designated leader and use this information to ACK all traffic, reducing the effectiveness of the leader-based ACK system. Further, by determining the leader of the network, a malicious agent can target that station for attack, potentially affecting the entire network by requiring that the AP rebroadcast packets that were lost by the leader during the attack. An embodiment of the present invention helps combat these issues through the use of random leader assignment.

Some embodiments of the present invention provide a level of protection to the wireless broadcast network with leader acknowledgements by minimizing the predictability of leader assignment. For any network, a leader may be chosen from a subset of connected stations. This subset may be determined through statistical comparison to see which stations fall within the boundary conditions. From this subset, the AP may randomly select a station and assign it as the leader. At a periodic interval, the AP will reassign the leader based on a sometimes different sub-set of available stations. An embodiment of the present invention, but not limited in this respect, provides that:

1. Each station in the network may report different statistics to the AP on a periodic basis. These statistics may include, but are not limited to:
   a. Received Signal Strength Indicator (RSSI)
   b. Packet Error Rate (PER)
   c. Signal-to-Noise Ratio (SNR)
      Additional metrics can also be reported.

2. Based on the statistic information received from the stations, the AP may determine a subset of acceptable stations that could be used as the leader. The subset boundaries could be determined by multiple criteria including, but not limited to:
   a. IT set boundaries (min/max RSSI, PER, etc.)
   b. Traffic characterization
   c. Available station count (defining minimum number of acceptable leaders before utilizing leader based ACKs)

Potential stations could be plotted in a uniform distribution of the identified criteria, from which a leader could be randomly chosen.

3. An AP may periodically randomly choose a new leader from the list of acceptable leaders (based on changing network conditions). The AP would ensure that the same station was not chosen again for a fixed period of time.

Figure 5:
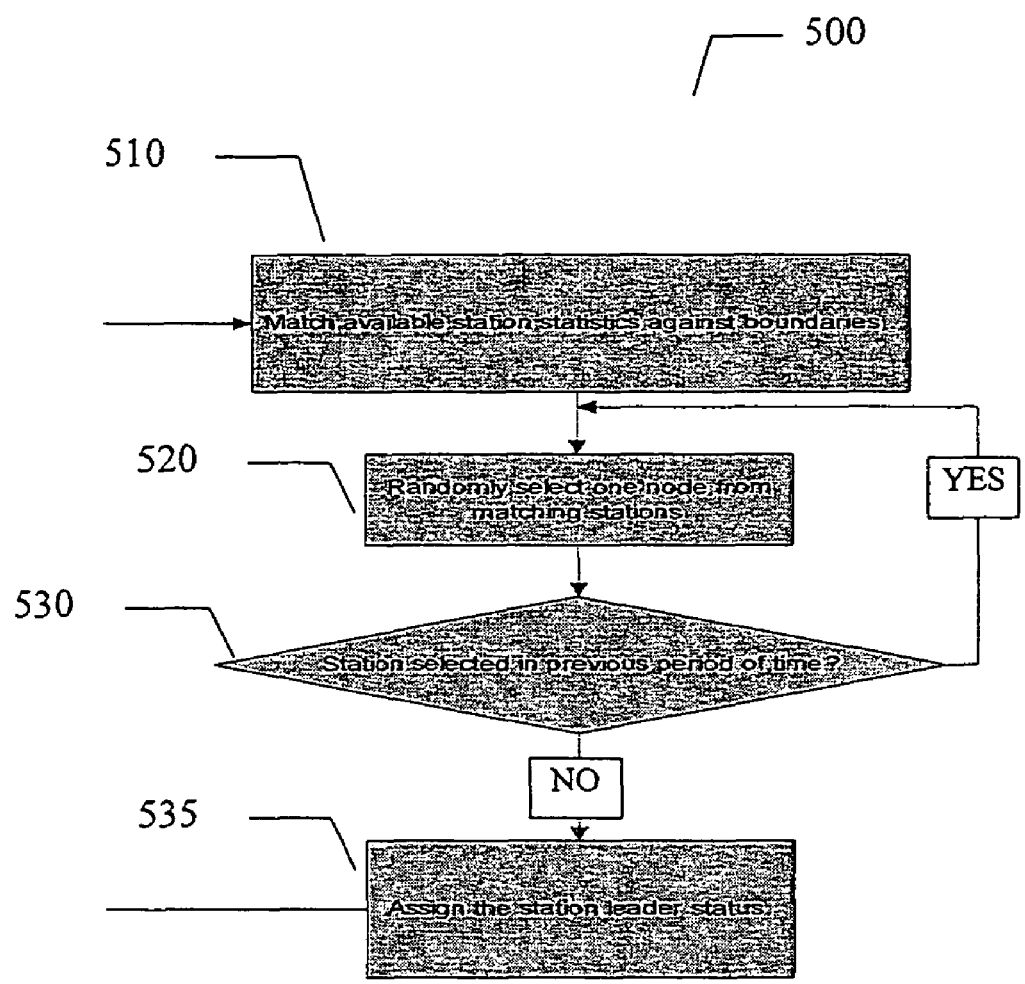
FIG. 5 is a flowchart showing periodic leader re-assignment in accordance with an embodiment of the invention.

Turning now to FIG. 5, shown as 500, is a flowchart of AP leader selection algorithm of one embodiment of the present invention. At 510 the process matches available station statistics against boundaries and at 520 a random selection of one node from matching stations is made. At 530 it is determined if the station was selected in a previous period of time and if so, the process returns to 520 and, if not, at 540 the station is assigned leader status.

By randomizing the leader selection process, the AP can help to minimize the chances that a malevolent station will be able to intercept and counterfeit acknowledgement as well as target the leader station. By utilizing a boundary mechanism for the random selection, the AP can ensure that even though a random station will be selected from a list of available stations, the station still falls within the acceptable statistical criteria for leader selection. This invention maximizes the security benefit of random selection while minimizing the effect of improper leader station selection.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a transmitter to transmit, in response to an incoming multicast communication frame received from a multicast communication source, a multicast acknowledgment frame indicating receipt of the incoming multicast communication frame, wherein said apparatus is randomly designated by the multicast communication source as a representative multicast communication recipient; and
wherein said representative multicast communication recipient is chosen from a subset of connected stations determined through statistical comparison to see which stations fall within a set of boundary conditions chosen from said subset at a periodic interval and wherein said multicast communication source will reassign the representative multicast communication recipient based on a subset of available stations and wherein said representative multicast communication recipient is chosen from said subset based upon statistics reported to said multicast communication source from said subset of connected stations, wherein said statistics include Received Signal Strength Indicator (RSSI), Packet Error Rate (PER) and Signal-to-Noise Ratio (SNR), and
wherein based on one or more messages received from said representative multicast communication recipient, said multicast communication source modifies multicast communication.

2. The apparatus of claim 1, wherein said subset of available stations include subset boundaries determined by multiple criteria including IT set boundaries, Traffic characterization and available station count.

3. The apparatus of claim 1, wherein said subset of available stations are plotted in a uniform distribution of identified criteria from which a representative multicast communication recipient is randomly chosen.

4. A method, comprising:
transmitting, in response to an incoming multicast communication frame received from a multicast communication source, a multicast acknowledgment frame indicating receipt of said incoming multicast communication frame, by a transmitter associated with an apparatus that is randomly designated by the multicast communication source as a representative multicast communication recipient; and
wherein said representative multicast communication recipient is chosen from a subset of connected stations determined through statistical comparison to see which stations fall within a set of boundary conditions chosen from said subset at a periodic interval and wherein said multicast communication source will reassign the representative multicast communication recipient based on a subset of available stations and wherein said representative multicast communication recipient is chosen from said subset based upon statistics reported to said multicast communication source from said subset of connected stations, wherein said statistics include Received Signal Strength Indicator (RSSI), Packet Error Rate (PER) and Signal-to-Noise Ratio (SNR), and wherein based on one or more messages received from said representative multicast communication recipient, said multicast communication source modifies multicast communication.

5. The method of claim 4, further comprising including in said subset of available stations subset boundaries determined by multiple criteria including IT set boundaries, Traffic characterization and available station count.

6. The method of claim 4, further comprising plotting said subset of available stations in a uniform distribution of identified criteria from which a representative multicast communication recipient is randomly chosen.

7. A machine-accessible medium that provides instructions, which when accessed, cause a machine to perform operations comprising:

transmitting, in response to an incoming multicast communication frame received from a multicast communication source, a multicast acknowledgment frame indicating receipt of said incoming multicast communication frame, by a transmitter associated with an apparatus that is randomly designated by the multicast communication source as a representative multicast communication recipient; and wherein said representative multicast communication recipient is chosen from a subset of connected stations determined through statistical comparison to see which stations fall within a set of boundary conditions chosen from said subset at a periodic interval and wherein said multicast communication source will reassign the representative multicast communication recipient based on a subset of available stations and wherein said representative multicast communication recipient is chosen from said subset based upon statistics reported to said multicast communication source from said subset of connected stations, wherein said statistics include Received Signal Strength Indicator (RSSI), Packet Error Rate (PER) and Signal-to-Noise Ratio (SNR), and wherein based on one or more messages received from said representative multicast communication recipient, said multicast communication source modifies multicast communication.

8. The machine-accessible medium of claim 7, further comprising said instructions causing said machine to perform operations further comprising including in said subset of available stations subset boundaries determined by multiple criteria including IT set boundaries, Traffic characterization and available station count.

9. The machine-accessible medium of claim 7, further comprising said instructions causing said machine to perform operations further comprising plotting said subset of available stations in a uniform distribution of identified criteria from which a representative multicast communication recipient is randomly chosen.

10. A system, comprising:

an access point (AP) adapted to multicast;

a wireless station (STA) with a transmitter to transmit, in response to an incoming multicast communication frame received from said AP, a multicast acknowledgment frame indicating receipt of the incoming multicast communication frame, wherein said STA is randomly designated by said AP as a representative multicast communication recipient; and wherein said representative multicast communication recipient is chosen from a subset of connected stations determined through statistical comparison to see which stations fall within a set of boundary conditions chosen from said subset at a periodic interval and wherein said multicast communication source will reassign the representative multicast communication recipient based on a subset of available stations and wherein said representative multicast communication recipient is chosen from said subset based upon statistics reported to said multicast communication source from said subset of connected stations, wherein said statistics include Received Signal Strength Indicator (RSSI), Packet Error Rate (PER) and Signal-to-Noise Ratio (SNR), and wherein based on one or more messages received from said representative multicast communication recipient, said multicast communication source modifies multicast communication.

* * * * *